United States Patent

Sensen et al.

[11] Patent Number: 5,674,540
[45] Date of Patent: Oct. 7, 1997

[54] WITHDRAWAL DEVICE FOR A BLOWN TUBULAR FILM

[75] Inventors: Klemens Sensen; Hans-Udo Beckmann, both of Lengerich; Jürgen Linkies, Lienen; Egon Kötter, Ladbergen; Ulrich Krause, Lienen, all of Germany

[73] Assignee: Windmöller & Hölscher, Lengerich/Westf., Germany

[21] Appl. No.: 554,791

[22] Filed: Nov. 7, 1995

[30] Foreign Application Priority Data

Nov. 14, 1994 [DE] Germany ............... 44 40 647.9

[51] Int. Cl.⁶ .......................................... B29C 53/20
[52] U.S. Cl. ............. 425/72.1; 264/209.3; 264/564; 425/326.1; 425/377; 425/387.1; 425/392; 425/403.1
[58] Field of Search ..................... 425/72.1, 325, 425/326.1, 327, 387.1, 392, 377, 403.1; 264/564, 565, 209.3, 209.5, 280, 294

[56] References Cited

U.S. PATENT DOCUMENTS

| | | | |
|---|---|---|---|
| 2,844,846 | 7/1958 | Kronholm | 425/72.1 |
| 3,804,571 | 4/1974 | Upmeier | 425/326.1 |
| 4,246,212 | 1/1981 | Upmeier et al. | 425/72.1 |
| 4,634,358 | 1/1987 | Dellbrugge | 264/564 |
| 4,643,656 | 2/1987 | Karl | 425/72.1 |
| 4,676,728 | 6/1987 | Planeta | 425/72.1 |
| 5,013,234 | 5/1991 | Reinhold | 425/392 |
| 5,106,281 | 4/1992 | Achelpohl | 425/392 |
| 5,437,544 | 8/1995 | Achelpohl | 425/72.1 |
| 5,529,470 | 6/1996 | Kahlen | 425/72.1 |

FOREIGN PATENT DOCUMENTS 0191114  8/1986  European Pat. Off. .

Primary Examiner—Jay H. Woo
Assistant Examiner—Joseph Leyson
Attorney, Agent, or Firm—Keck, Mahin & Cate

[57] ABSTRACT

A withdrawal device for a plastic tubular film is manufactured in a blowing method by an extruder. To prevent the formation of center wrinkles in the withdrawal of plastic tubular film, at least one deflection cylinder and/or angle bar has a differing diameter across its length.

13 Claims, 2 Drawing Sheets

WITHDRAWAL DEVICE FOR A BLOWN TUBULAR FILM

FIELD OF THE INVENTION

The invention pertains to a withdrawal device for a plastic tubular film manufactured in a blowing method by an extruder and, in particular, to the configuration of at least one deflection cylinder and/or angle bar.

BACKGROUND OF THE INVENTION

A withdrawal device for a plastic tubular film is known, for example, from EP 0,191,114 B1. After the plastic tubular film emerging from the blowing head of an extruder has been laid flat, it is guided by means of angle bars and deflection cylinders which, as a rule, are in a reversing arrangement.

According to the state of the art, angle bars were frequently executed in a way allowing compressed air to flow through them, which can emerge through drilled holes distributed across the casing of the angle bars, in order for an insulating air cushion to be formed between the surface of the angle bar and the plastic tubular film drawn over it. In particular, in processing films that range from adhesive to sticky, it is particularly desirable to carry the film with large insulating air cushions, as this causes the film guided over the angle bar to float on the entire width of the angle bar.

However, in the case of reversing withdrawal with air angle bars, a high insulating cushion of air causes a center wrinkle to occur in the center of the web. This center wrinkle prevents a perfect wind up of the plastic tubular film. For this reason, the film is carried in practice with a smaller insulating air cushion; this does counteract the formation of wrinkles in the center section of the angle bar but leads to a more or less severe contact between the film and the angle bar, precisely in the processing of films that range from adhesive to sticky.

Angle bars executed according to the state of the art to be cylindrical, for which partial grooves, channels or the like are provided apart from the aforementioned drilled outlet holes, do not lead to a remedy with respect to the problem of the aforementioned formation of center wrinkles.

SUMMARY OF THE INVENTION

It is now the purpose of the invention to improve a withdrawal device for a plastic tubular film manufactured in a blowing method by an extruder in a way which enables processing, free from disturbances, of even films that range from adhesive to sticky. In particular, it is the purpose of the present invention to prevent the formation of a center wrinkle as the plastic tubular film is being withdrawn.

Starting from a withdrawal device, itself known, for a plastic tubular film manufactured in a blowing method by an extruder, this problem is solved according to the invention in that at least one deflection cylinder and/or angle bar features a differing diameter across its length. In particular, it has proven advantageous if the surface of the deflection cylinder and/or angle bar is developed to be concave.

In addition, the center region of the deflection cylinder and/or angle bar can advantageously feature a low-friction surface while its side regions feature a more strongly abrasive, thus, frictionally adhering surface. The low-friction surface in the center region can be realized by means of a corresponding hard chrome-plating of the surface, while the frictionally adhering, surface can be created by means of a corresponding roughening of the surface.

According to an advantageous improvement, the center region makes up approximately ⅓ of the length, while the respective side regions each also make up ⅓ respectively of the overall length of the deflection cylinder. Alternatively to this, the center region can also make up approximately half the length of the surface, while the respective side regions each then comprise approximately ¼ of the length.

According to an advantageous configuration, the angle bar can also be executed to be crowned.

BRIEF DESCRIPTION OF THE DRAWINGS

Additional details and advantages of the invention are more closely explained with the aid of embodiments represented in the drawings.

DETAILED DESCRIPTION OF THE PREFERRED EMBODIMENTS

Figure 1:
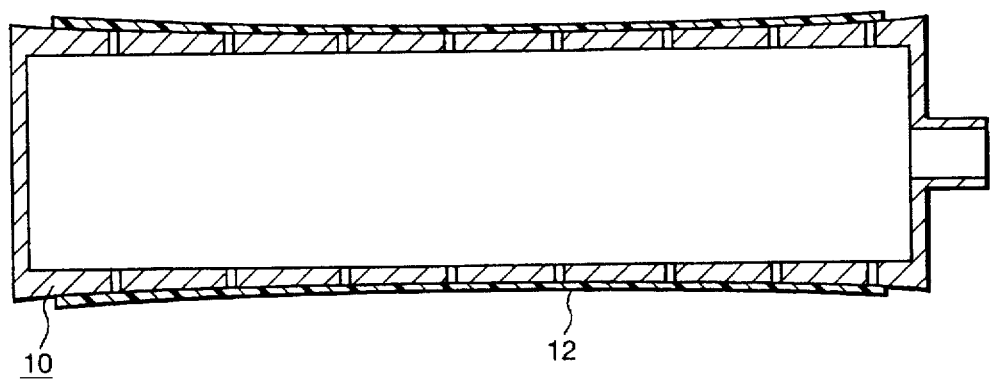
FIG. 1: A deflection cylinder according to one embodiment of the present invention.
Figure 2:
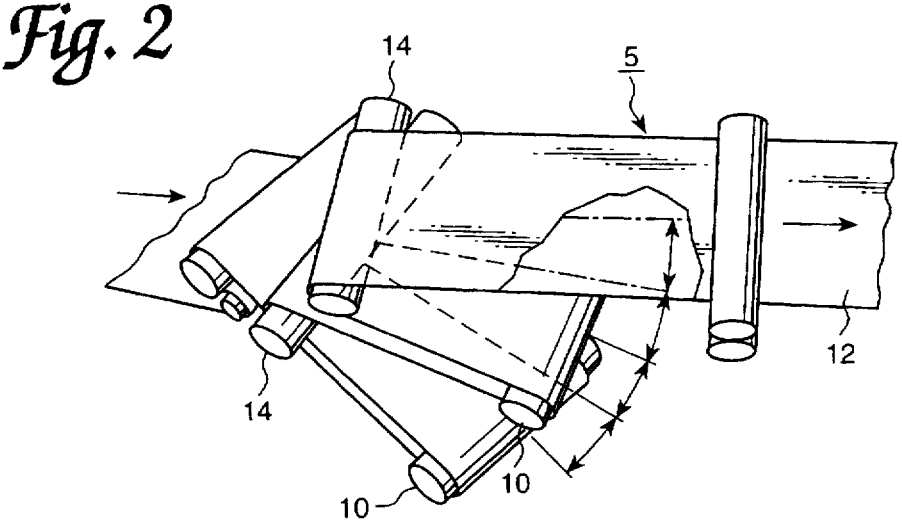
FIG. 2: A withdrawal device in perspective view in a first working position.
Figure 3:
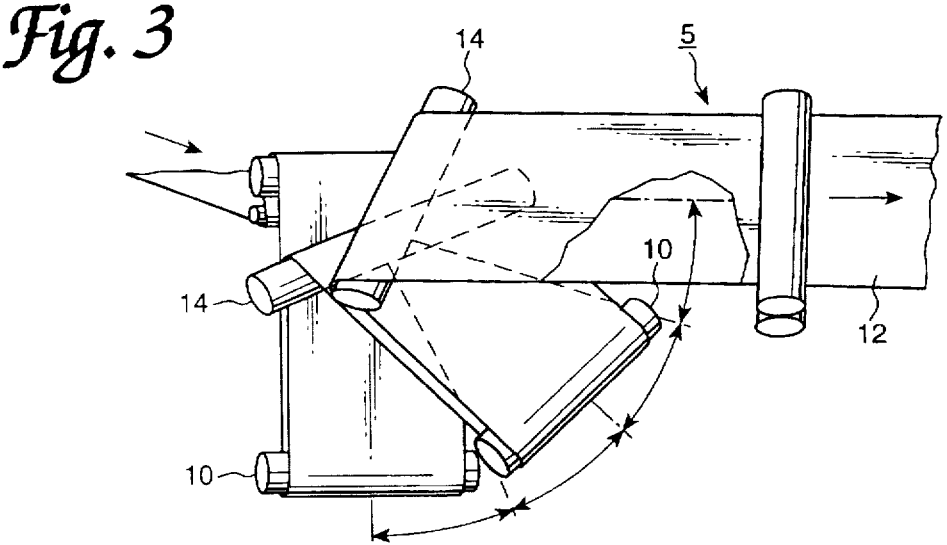
FIG. 3: A withdrawal device in perspective view in a second working position.
Figure 4:
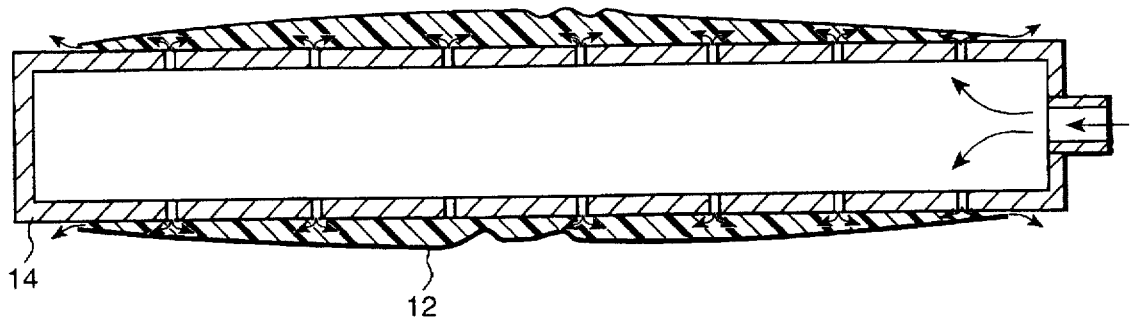
FIG. 4: An illustration of a known angle bar construction.
Figure 5:
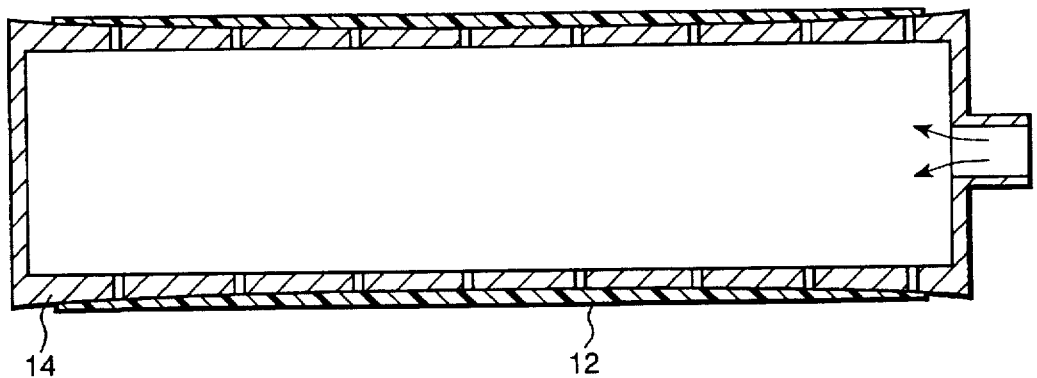
FIGS. 5–6: Various embodiments of an angle bar according to the invention.
Figure 6:
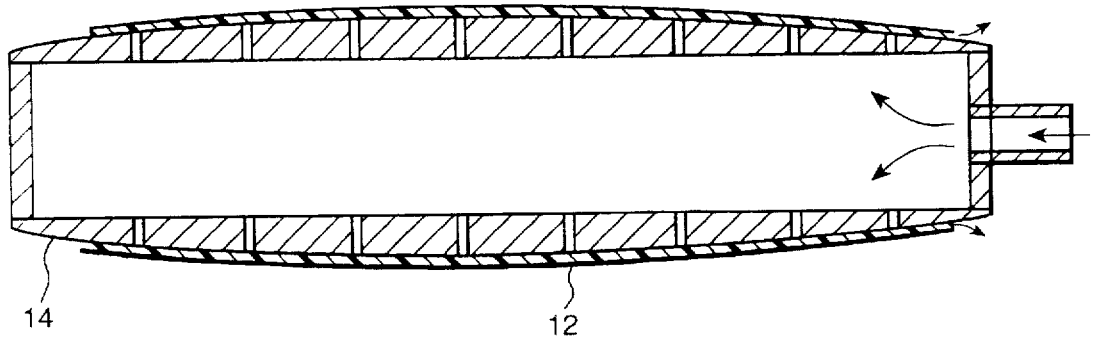

Deflection cylinder (10) according to the present invention is represented in FIG. 1. It differs from a conventional deflection cylinder in that its surface is developed to be concave. In the embodiment represented here, the center region of the deflection cylinder, comprising approximately ⅓ of the length of deflection cylinder (10), has a hard chrome-plating on the surface so that a low-friction surface is obtained here. The surface is roughened on the respective sides so that a frictionally adhering surface is created here. The respective side regions likewise each comprise approximately ⅓ of the overall length of deflection cylinder (10). Plastic tubular film (12), laid flat, is taken down by means of deflection cylinder (10). Reversing withdrawal devices (5) in various angled positions are represented in FIGS. 2 and 3. The plastic tubular film runs in the direction of the arrow through the withdrawal device. The two deflection cylinders, which are both executed to be concave in a manner corresponding to the embodiment according to FIG. 1, are indicated as (10). The respective angle bars, which can be of conventional construction (compare FIG. 4), can also be concave in a manner corresponding to deflection cylinder (10) outlined above (see FIG. 5) are indicated as (14). The formation of wrinkles in the center region of the plastic tubular film is effectively prevented by means of the corresponding concave configuration of the deflection cylinder. The formation of wrinkles, indicated in FIG. 4, can also be prevented by means of a concave development of at least one angle bar (14), as shown in FIG. 5, or by means of a convex development of at least one angle bar (14) according to FIG. 6. The combination of correspondingly formed angle bars (14) with deflection cylinders developed according to the invention also leads to an elimination of the formation of wrinkles.

We claim:

1. A withdrawal device for a plastic tubular film manufactured in a blow molding method by an extruder, comprising:

deflection cylinders and angle bars, the cylinders and bars being in a reversing arrangement for withdrawing the tubular film, wherein at least one of said deflection cylinders and angle bars comprises a surface having a differing diameter across a length thereof to prevent formation of wrinkles in a center portion of the film during withdrawal on the one of said deflection cylinders and angle bars.

2. A withdrawal device as in claim 1, wherein the surface of said at least one of said deflection cylinders and angle bars is concave.

3. A withdrawal device as in claim 1, wherein a center region of said surface of said at least one of said deflection cylinders and angle bars comprises a low friction surface and side regions thereof comprise a frictionally adhering surface.

4. A withdrawal device as in claim 3, wherein the center region comprises approximately ⅓ of the surface length, and the respective side regions each comprise approximately ⅓ of the surface length.

5. A withdrawal device as in claim 3, wherein the center region comprises approximately half of the surface length, and the respective side regions each comprise approximately ¼ of the length.

6. A withdrawal device as in claim 3, wherein the center region has a hard-chromed surface.

7. A withdrawal device as in claim 3, wherein the side regions are roughened.

8. A withdrawal device as in claim 1, wherein at least one of said angle bars has a convex surface.

9. A withdrawal device as in claim 2, wherein a center region of said surface of said at least one of said deflection cylinders and angle bars comprises a low friction surface and side regions thereof comprise a frictionally adhering surface.

10. A withdrawal device as in claim 9, wherein the center region comprises approximately ⅓ of the surface length, and the respective side regions each comprise approximately ⅓ of the surface length.

11. A withdrawal device as in claim 9, wherein the center region comprises approximately half of the surface length, and the respective side regions each comprise approximately ¼ of the length.

12. A withdrawal device as in claim 9, wherein the center region has a hard-chromed surface.

13. A withdrawal device as in claim 9, wherein the side regions are roughened.

* * * * *